United States Patent [19]
Gross

[11] 3,872,363
[45] Mar. 18, 1975

[54] ELECTRIC MOTOR BRAKING SYSTEM

[76] Inventor: Thomas A. O. Gross, Concord Rd., Lincoln, Mass. 01773

[22] Filed: Mar. 11, 1974

[21] Appl. No.: 449,947

[52] U.S. Cl................ 318/212, 318/377, 318/227
[51] Int. Cl. ............................................ H02p 3/20
[58] Field of Search .......... 318/211, 212, 221, 227, 318/375, 377, 378

[56] References Cited
UNITED STATES PATENTS

| | | | |
|---|---|---|---|
| 2,929,977 | 3/1960 | Choudhury | 318/212 |
| 3,398,343 | 8/1968 | Plumpe, Jr. | 318/212 |
| 3,412,304 | 11/1968 | Baum et al. | 318/221 R |

*Primary Examiner*—G. Z. Rubinson
*Attorney, Agent, or Firm*—Kenway & Jenney

[57] ABSTRACT

In the electric motor braking system disclosed herein, braking is accomplished by applying pulsating direct current to one winding of an a.c. motor having at least a pair of windings. Control over the energization of the braking circuit is exercised by a means which senses and responds to the a.c. voltage induced in a different one of the motor windings during braking, energization of the braking circuit being terminated when this induced a.c. voltage falls below a predetermined level.

11 Claims, 2 Drawing Figures

ELECTRIC MOTOR BRAKING SYSTEM

BACKGROUND OF THE INVENTION

This invention relates to an electric motor braking system and more particularly to such a system which provides for the automatic termination of dynamic braking.

Various braking systems have been proposed for quickly stopping a.c. motors in which at least one of the motor windings is energized with direct current rather than with the alternating current normally applied during running or starting. In one such system, disclosed in my co-pending application Ser. No. 232,482, now U.S. letters Pat. No. 3,798,523, the starting capacitor normally provided in a capacitor start motor is utilized as a current limiting impedance which restricts the energization of and thereby protects a d.c. braking circuit. Various other systems for applying d.c. to the windings of an a.c. motor are also disclosed in the prior art references cited in the prosecution of the application.

Typically, however, such prior art braking systems have required that the energization of the braking circuit be controlled either manually or by a separate timing circuit so that the braking circuit does not continue to be energized for an indefinite period after the motor has come to a complete stop. Either of these approaches raises certain problems in terms of consumer acceptance and/or cost and complexity.

Among the several objects of the present invention may be noted the provision of an improved braking system for a.c. motors; the provision of such a system which provides automatic deenergization of the braking circuit; the provision of such a system which does not require a timer for braking and which does not require manual actuation of the braking system; the provision of such a system which is highly reliable and which is of relatively simple and inexpensive construction.

Other objects and features will be in part apparent and in part pointed out hereinafter.

SUMMARY OF THE INVENTION

In general, the present invention utilizes the cross-coupling which occurs between phase shifted windings in an a.c. motor when the rotor is moving at any significant speed.

A control and braking system in accordance with the present invention operates in conjunction with an a.c. motor of the type having a rotor and having also a stator provided with at least a pair of windings, the windings being displaced in phase around the stator. Switching means are provided having a run state and a stop state, at least one of the windings being energized with a.c. in the run state to produce continued rotation of the rotor. A braking circuit is provided which, when energized, applies pulsating d.c. to one of the windings for braking the rotor, the braking circuit being interconnected with the switching means so as to be energizable only while the switching means is in the stop state. When the braking circuit is energized, the pulsating component is coupled from the energized winding to the other of the windings as long as the rotor is rotating. A sensing means interconnected with the aforesaid other winding responds to the induced pulsatile current component during braking and maintains the energization of the braking circuit as long as the amplitude of the induced or cross-coupled pulsatile component exceeds a predetermined level.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
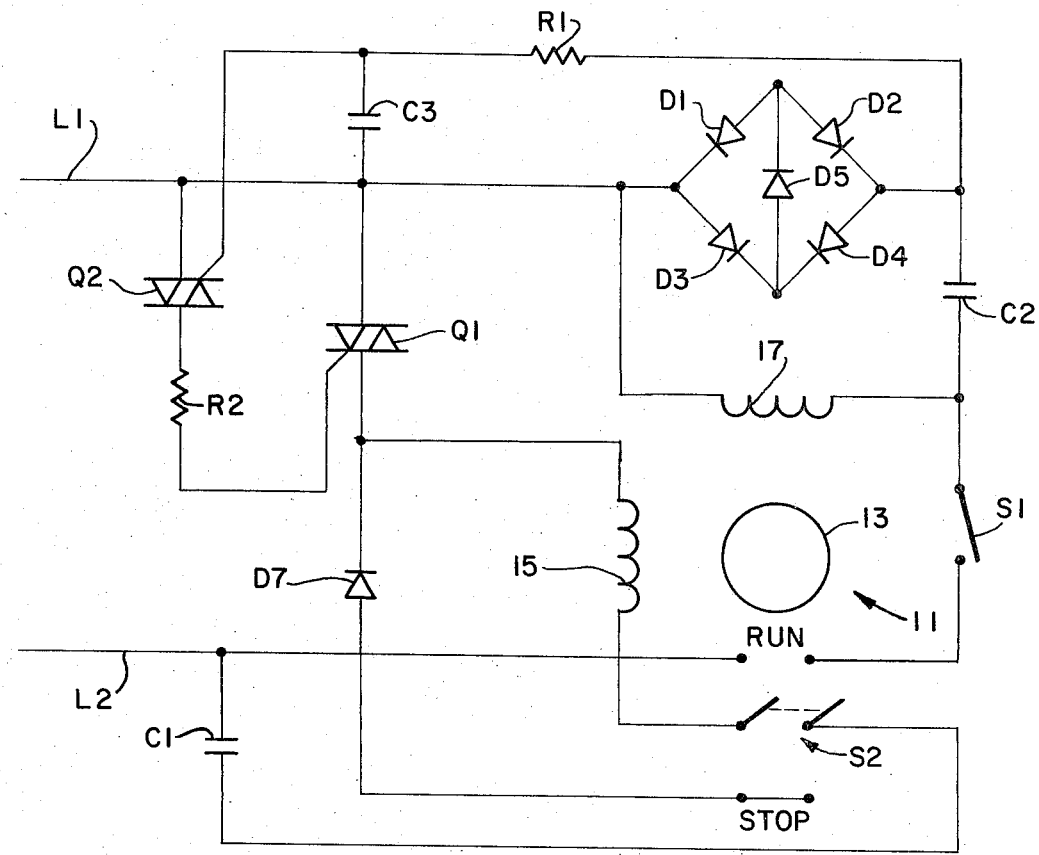
FIG. 1 is a schematic circuit diagram of an a.c. motor system providing dynamic braking in accordance with the present invention, semiconductor switching elements being used in controlling winding energization.

Referring now to FIG. 1, there is indicated at 11 generally a capacitor-start a.c. induction motor. Motor 11 comprises a magnetically permeable squirrel cage rotor 13, a run winding 15, and a start winding 17. Motor 11 also includes a centrifugal start switch S1 which operates during starting to energize start winding 17 through a starting capacitor, designated C1, the complete circuit being described in greater detail hereinafter. While the invention is disclosed by way of the example in conjunction with a capacitor-start motor operating normally on single-phase current, it should be understood that the teachings of the present invention may also be applied or extended to polyphase motors having sets of windings corresponding to the phasing of the supply mains.

A manually operated, double-pole, double-throw switch S2 is provided for starting and stopping motor 11. In accordance with the practice of the present invention, the manual control switch S2 does not have to have any third or intermediate position to provide for dynamic braking.

A.c. supply leads are indicated at L1 and L2. When the switch S2 is in its run position, i.e., the upper position, winding 15 is energizable from the supply leads through a circuit which includes one pole of the switch S2 and a power triac Q1. At the same time, start winding 17 is energizable from the leads L1 and L2 through a circuit which includes the starting capacitor C1, the other pole of switch S2 and the centrifugal starting switch S1. Conduction through power triac Q1 is controlled by means of a driver triac Q2, the anode of triac Q2 being coupled to the gate of power triac Q1 through a resistor R2.

During starting, that is, while the start winding 17 is externally energized through the starting capacitor C1, a substantial a.c. voltage is directly impressed across the start winding. At least a portion of this voltage is coupled to the gate of driver triac Q2 through a capacitor C2 and a phase shifting network comprising resistor R1 and capacitor C3. As indicated previously, conduction through triac Q2 produces conduction through power triac Q1 and thus the run winding 15 is energized simultaneously with the start winding during starting. In order to prevent over-driving of the triac Q2, the voltage obtained from across the start winding 17 is preferably clipped or limited. Such clipping is conveniently provided by a full wave bridge comprising silicon diodes D1–D4 together with a fifth silicon diode D5 which shunts the d.c. output circuit of the bridge.

As will be appreciated by those skilled in the art, the maximum voltage which will appear, in either direction, across the other diagonal of the bridge will be equal to three forward biased diode drops i.e. a total of about 2 volts. The bridge is connected so as to limit or clip the voltage in the triggering circuit at a point between the capacitor C2 and the resistor R1, any excess voltage developed across the start winding then appearing the capacitor C2.

As indicated previously, it has been discovered that an a.c. or otherwise pulsatile voltage impressed on one winding of an a.c. motor will be coupled to a phase-displaced or quadrature winding on the same stator so long as the rotor is rotating at any significant speed. In the embodiment illustrated in FIG. 1, this cross-coupled voltage is employed, not only to control the braking circuit as described hereinafter, but also to maintain energization of the run winding of motor 11 during continued running, i.e., after the starting phase is completed. This occurs as follows. After the speed of rotor 13 reaches the operating point of switch S1, at which point the switch opens, the triac Q1 will still be triggered since an a.c. voltage will be induced in the start winding 17 by virtue of the energization of the run winding 15 and the rotation of the rotor.

In order to provide a pulsatile voltage which can be cross-coupled and sensed so as to control braking, the apparatus of FIG. 1 provides a braking circuit which can be energized only when the switch S2 is in its stop, i.e., lower, position. When the switch S2 is in its stop position, the run winding 15 is energizable from the supply leads L1 and L2 through a braking circuit which includes triac Q1 and the starting capacitor C1. As in the system disclosed in my aforementioned co-pending application, the starting capacitor provides a voltage dropping or current limiting function. The braking circuit also includes a diode D7 which shunts the main or run winding 15. Accordingly, as will be understood by those skilled in the art, the run winding will be energized by pulsating or half wave rectified d.c., conduction on alternate half cycles being through the diode D7 which recharges the capacitor C1 without allowing a corresponding voltage to be developed across the winding 15.

As will also be understood by those skilled in the art, the pulsating d.c. energization of run winding 15 is equivalent to a substantial a.c. component applied in conjunction with a relatively steady d.c. As long as the rotor 13 is rotating with any significant speed, this a.c. component will be cross-coupled to the start winding 17 in the same manner as any other a.c. signal. Thus a.c. induced in the start winding 17 causes the driver triac Q2 to continue to be triggered, in turn maintaining the energization of the run winding 15 through the power triac Q1. Meanwhile, however, the d.c. component applied to run winding 17 will produce dynamic braking. As the rotor 13 slows, the signal induced across winding 17 will also decrease, eventually falling below the predetermined level required to trigger the triacs. At this point, the braking circuit will be de-energized even though the switch S2 is still in the stop position. Thus an automatic de-energization of the braking circuit is obtained without requiring any manual switch more complicated than a conventional double-pole double-throw device.

In one particular construction of the apparatus shown in FIG. 1, the following component types and values were utilized to obtain dynamic braking of a capacitor-start induction motor of about 2 horsepower rating.

C1 = 550 microfarad
C2 = 5 microfarad
C3 = 0.05 microfarad
R1 = 22 ohms
R2 = 82 ohms
D1–D4 = MDA 920-1 (Motorola)
D5 = 1N4001
D7 = 1N3493
Q1 = SC 261 B (G.E.)
Q2 = T 2300 B (RCA)

Figure 2:
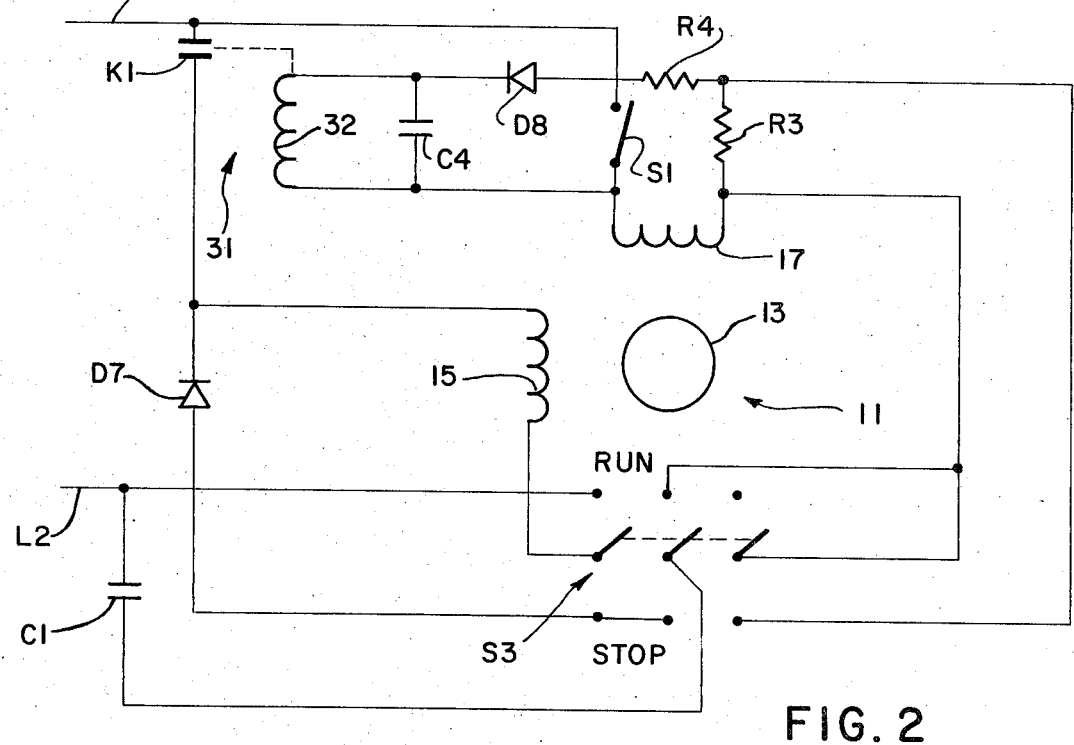
FIG. 2 is a schematic circuit diagram of another embodiment of a control system according to the present invention, employing a d.c. relay.

While the embodiment of FIG. 1, which employs semi-conductor switching elements, is believed at the present time to be preferable, some applications may require the positive circuit interruption provided by metallic relay contacts. The automatic braking system of the present invention may be adapted to such a switching arrangement as illustrated in FIG. 2. In the embodiment of FIG. 2, the circuitry energizing the main or run winding 15 is similar to that illustrated in FIG. 1, except that the power triac is replaced by a d.c. relay 31 having contacts K1 for connecting the main winding to the supply lead L1. In this embodiment, use is made of the substantial hysteresis characteristic of d.c. relays, i.e. the tendency of such relays to pull-in or close at a predetermined current level but then to remain closed until the current level drops to a significantly lower level. This drop-out current level may, in fact, be an order of magnitude lower than the pull-in current. To permit the relay to be energized from a.c. signals, the relay winding 32 is energized through a diode D8 and the winding is shunted by a capacitor C4 which filters the rectified a.c. and slows the response of the relay.

During starting, the start winding 17 is energized in essentially the same manner as in the embodiment of FIG. 1, i.e. through the starting capacitor C1, the second pole of a run/stop switch (designated S3 in this embodiment) and the centrifugal start switch S1. The voltage applied to the start winding is also applied, through a pair of dropping resistors R3 and R4, to the winding circuit of relay 31. Thus the contacts K1 will be closed during starting and the main winding will be energized together with the start winding so that the motor can come up to speed.

Once the centrifugal start switch S1 opens, the relay winding is no longer energized from the supply lead but the voltage induced in the start winding 17 by virtue of the a.c. energization of the run winding 15 and the rotation of the rotor 13 is sufficient to maintain the contacts K1 closed, particularly in view of the substantial differential between pull-in and drop-out currents, as discussed previously.

When it is desired to de-energize and brake the motor, the manually operable switch S3 is thrown to its lower or stop position. The first two poles of the run/stop switch S3 cause the main or run winding 15 to be energized with pulsating d.c., as in the previous embodiment. The third pole of the switch S3 shunts the dropping resistor R3 so that voltage appearing across the start winding 17 is more directly applied to the relay coil circuit than during running. Accordingly, even though the a.c. or pulsatile component of the voltage impressed on the run winding 15 is reduced during braking, the amplitude of the signal induced in the start winding 17 will still be sufficient to maintain the closure of the contacts K1, at least initially.

As the rotor 13 approaches stopping, however, it will be seen that the cross-coupled voltage induced in the start winding 17 will finally fall below a predetermined level which is necessary to maintain energization of the relay 31. At this point, the contacts K1 will open and the braking circuit will become de-energized. As will be understood by those skilled in the art, the relative point at which this occurs can be adjusted by properly selecting the relative values of the resistors R3 and R4 so that, while the resistor R3 limits the current continuously applied to the relay winding during running of the motor, sufficient sensitivity is provided to maintain braking until rotor 13 is adequately slowed.

In one particular construction of the apparatus shown in FIG. 2, the following component types and values were utilized to obtain dynamic braking of a capacitor-start induction motor of about 1/12 horsepower rating.

C1 = 75 microfarad
C4 = 40 microfarad
R3 = 1,500 ohms
R4 = 10 ohms
D7 = IN 5624
D8 = IN 5059
Relay 31 = 65 F1A-6DC (Sigma)

In view of foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An a.c. motor system providing dynamic braking, said system comprising:
    a motor having a rotor and a stator having at least a pair of windings, said windings being displaced in phase around said stator;
    switching means having a run state and a stop state, at least one of said windings being energized with a.c. in said run state to produce continued rotation of said rotor;
    a braking circuit which, when energized, applies pulsating d.c. to one of said windings for braking said rotor, the pulsating component being coupled to the other of said windings while said rotor is rotating, said braking circuit being energizable only while said switching means is in said stop state; and
    sensing means interconnected with said other winding and responsive to the pulsatile current component coupled thereto during braking for energizing said braking circuit as long as the amplitude of the coupled component exceeds a predetermined level and said switching means is in said stop state.

2. An a.c. motor system as set forth in claim 1 including a capacitor, wherein said switching means can energize said other winding through said capacitor in said run state and wherein said switching means can energize said braking circuit through said capacitor in said stop state.

3. An a.c. motor system as set forth in claim 2 including a diode, wherein said switching means connects said diode across said one winding during energization of said braking circuit.

4. A dynamic braking control system for use with a capacitor start a.c. motor of the type having a magnetically permeable rotor and having also run and start windings which are displaced in phase around the stator of the motor, said motor being provided with a starting capacitor said control system comprising:
    switching means having a run state and a stop state, said switching means being operative in said run state for directly energizing said run winding and for energizing said start winding through said starting capacitor during starting to provide an initial torque;
    braking circuit, including rectifying means, for applying pulsatile d.c. to said run winding for braking the rotor, the pulsating component being coupled to said start winding while said rotor is rotating; and
    sensing means interconnected with said start winding and said switching means and responsive to the pulsatile current component coupled to said start winding for energizing said braking circuit through said capacitor as long as the amplitude of the coupled component exceeds a predetermined level and said switching means is in said stop state.

5. A dynamic braking a.c. motor system comprising:
    a capacitor start a.c. motor of the type having a rotor and having also run and start windings which are displaced in phase around the stator of the motor;
    a starting capacitor for said motor;
    switching means having a run state and a stop state, said switching means being operative in said run state for directly energizing said run winding and for energizing said start winding through said capacitor during starting to provide an initial torque;
    a braking circuit, including a diode, for applying pulsatile d.c. to said run winding for braking the rotor, the pulsating component being coupled to said start winding while said rotor is rotating; and
    sensing means interconnected with said start winding and said switching means and responsive to the pulsatile current component coupled to said start winding for energizing said braking circuit through said capacitor as long as the amplitude of the coupled component exceeds a predetermined level and said switching means is in said stop state, said diode being connected across said run winding when said switching means is in said stop state for shunting alternate half cycles of a.c. voltages applied to said run winding.

6. A system as set forth in claim 5 wherein said sensing means includes a relay having a winding which is energized as a function of said coupled pulsatile component.

7. A system as set forth in claim 6 wherein said relay is a d.c. relay and said system includes means for rectifying said pulsatile component to energize said relay.

8. A system as set forth in claim 6 further including a droppping resistor in series with said rectifying means and wherein said switching means includes contacts for starting said dropping resistor in said stop state.

9. A system as set forth in claim 5 wherein said sensing means includes a triggerable semiconductor switching device which, when it conducts, energizes said braking circuit through said capacitor and which is triggered in response to the coupled pulsatile component.

10. A system as set forth in claim 9 wherein said semiconductor switching device is a triac.

11. A system as set forth in claim 9 further comprising means for limiting said pulsatile component.

* * * * *